United States Patent
Muller et al.

(10) Patent No.: US 9,657,135 B2
(45) Date of Patent: May 23, 2017

(54) METHOD FOR PRODUCING POLYETHER ESTER CARBONATE POLYOLS

(71) Applicant: Covestro Deutschland AG, Monheim am Rhein (DE)

(72) Inventors: Thomas Ernst Muller, Aachen (DE); Christoph Gurtler, Cologne (DE); Muhammad Afzal Subhani, Aachen (DE); Walter Leitner, Aachen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/121,590

(22) PCT Filed: Feb. 23, 2015

(86) PCT No.: PCT/EP2015/053692
§ 371 (c)(1),
(2) Date: Aug. 25, 2016

(87) PCT Pub. No.: WO2015/128277
PCT Pub. Date: Sep. 3, 2015

(65) Prior Publication Data
US 2016/0362518 A1    Dec. 15, 2016

(30) Foreign Application Priority Data

Feb. 26, 2014 (EP) .................... 14156831
Dec. 12, 2014 (EP) .................... 14197726

(51) Int. Cl.
C08G 65/26    (2006.01)
C08G 64/34    (2006.01)
C08G 18/48    (2006.01)

(52) U.S. Cl.
CPC ......... *C08G 65/2615* (2013.01); *C08G 64/34* (2013.01); *C08G 65/26* (2013.01); *C08G 65/2603* (2013.01); *C08G 65/2663* (2013.01); *C08G 65/2696* (2013.01); *C08G 18/4825* (2013.01)

(58) Field of Classification Search
CPC . C08G 65/2663; C08G 18/4825; C08G 65/26
See application file for complete search history.

(56) References Cited

U.S. PATENT DOCUMENTS

2010/0048935 A1    2/2010    Mijolovic et al.
2012/0289732 A1*   11/2012   Gurtler .............. C08G 64/0208
                                                            558/266
2014/0323670 A1    10/2014   Muller et al.
2014/0329987 A1    11/2014   Gurtler et al.

OTHER PUBLICATIONS

International Search Report and Written Opinion for International Application No. PCT/EP2015/053692, European Patent Office, May 29, 2015.

* cited by examiner

*Primary Examiner* — Gregory Listvoyb
(74) *Attorney, Agent, or Firm* — K&L Gates LLP

(57) ABSTRACT

The invention relates to a method for producing polyether ester carbonate polyols by attaching at least one alkylene oxide, at least one cyclical anhydride, and carbon dioxide to one or more H-functional starter substances in the presence of a double metal cyanide catalyst. The method is characterized in that ($\alpha$) a suspension agent, which does not contain H-functional groups, is provided in a reactor, and ($\gamma$) one or more H-functional starter substances are continuously metered into the reactor during the reaction process, and the one or more alkylene oxides, the cyclical anhydride, and optionally the carbon dioxide are metered simultaneously or sequentially.

16 Claims, No Drawings

METHOD FOR PRODUCING POLYETHER ESTER CARBONATE POLYOLS

CROSS-REFERENCE TO RELATED APPLICATIONS

This application is a U.S. national stage application, filed under 35 U.S.C. §371, of PCT/EP2015/053692, which was filed on Feb. 23, 2015, and which claims priority to European Patent Application No. EP 14156831.1, which was filed on Feb. 26, 2014, and to European Patent Application No. EP 14197726.4, which was filed on Dec. 12, 2014, the contents of each of which are incorporated by reference into this specification.

FIELD OF THE INVENTION

The present invention relates to a process for preparing polyether ester carbonate polyols by adding at least one alkylene oxide, at least one cyclic anhydride and carbon dioxide onto one or more H-functional starter substances in the presence of a double metal cyanide catalyst. The invention further relates to a polyether ester carbonate polyol obtainable by this process.

BACKGROUND

The preparation of polyether carbonate polyols by catalytic reaction of alkylene oxides (epoxides) and carbon dioxide in the presence of H-functional starter substances ("starters") has been the subject of intensive study for more than 40 years (e.g. Inoue et al., Copolymerization of Carbon Dioxide and Epoxide with Organometallic Compounds; Die Makromolekulare Chemie 130, 210-220, 1969). This reaction is shown in schematic form in scheme (I), where R is an organic radical such as alkyl, alkylaryl or aryl, each of which may also contain heteroatoms, for example O, S, Si, etc., and where e, f and g are each integers, and where the product shown here in scheme (I) for the polyethercarbonate polyol should merely be understood in such a way that blocks having the structure shown may in principle be present in the polyethercarbonate polyol obtained, but the sequence, number and length of the blocks and the OH functionality of the starter may vary, and it is not restricted to the polyethercarbonate polyol shown in scheme (I). This reaction (see scheme (I)) is highly advantageous from an environmental standpoint since this reaction comprises converting a greenhouse gas such as $CO_2$ into a polymer. A further product, actually a by-product, formed here is the cyclic carbonate shown in scheme (I) (for example, when R=$CH_3$, propylene carbonate).

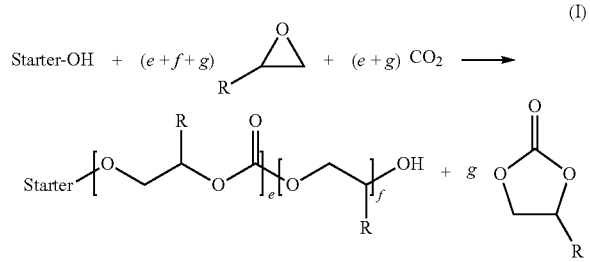

(I)

WO 20013/087582 A2 discloses the terpolymerization of propylene oxide, anhydrides and carbon dioxide in the presence of a double metal cyanide catalyst, wherein one or more H-functional starter substances are initially charged in the reactor.

EP 11194164.7 discloses the activation of double metal cyanide catalysts for the copolymerization of propylene oxide and carbon dioxide in the presence of cyclic anhydrides, characterized in that, in a first activation stage, the DMC catalyst and at least one H-functional starter substance are initially charged in the reactor. Neither application discloses activation of the double metal cyanide catalyst in the absence of starter substances.

EP-A 0 222 453 discloses a process for preparing polycarbonates from alkylene oxides and carbon dioxide using a catalyst system composed of DMC catalyst and a cocatalyst such as zinc sulfate. This polymerization is initiated by one-off contacting of a portion of the alkylene oxide with the catalyst system. Only thereafter are the residual amount of alkylene oxide and the carbon dioxide added simultaneously. The amount of 60% by weight of alkylene oxide compound relative to the H-functional starter compound, as specified in EP-A 0 222 453 for the activation step in examples 1 to 7, is high and has the disadvantage that this constitutes a certain safety risk for industrial scale applications because of the high exothermicity of the homopolymerization of alkylene oxide compounds.

WO-A 2003/029325 discloses a process for preparing high molecular weight aliphatic polyethercarbonate polyols (weight-average molecular weight greater than 30 000 g/mol), in which a catalyst from the group consisting of zinc carboxylate and multimetal cyanide compound is used, this catalyst being anhydrous and first being contacted with at least a portion of the carbon dioxide before the alkylene oxide is added. Final $CO_2$ pressures of up to 150 bar place very high demands on the reactor and on safety. Even the extremely high pressure of 150 bar resulted in incorporation of only about 33% by weight of $CO_2$ up to a maximum of 42% by weight of $CO_2$. The accompanying examples describe the use of a solvent (toluene) which has to be removed again by thermal means after the reaction, thus resulting in increased time and cost demands. Furthermore, the polymers, with a polydispersity of 2.7 or more, have a very broad molar mass distribution.

WO-A 2008/092767 discloses a process for preparing polyethercarbonate polyols, characterized in that one or more H-functional starter substances are initially charged in the reactor and in that one or more H-functional starter substances are metered continuously into the reactor during the reaction. This process thus has the drawback that one or more H-functional starter substances have to be initially charged in the reactor.

EP-A 2 703 425 A1 discloses a process for preparing polyether carbonate polyols by addition of alkylene oxides and carbon dioxide onto one or more H-functional starter substances in the presence of a double metal cyanide catalyst, wherein a suspension medium which does not contain any H-functional groups and is selected from one or more compounds from the group consisting of aliphatic lactones, aromatic lactones, lactides, cyclic carbonates having at least three optionally substituted methylene groups between the oxygen atoms of the carbonate group, aliphatic cyclic anhydrides and aromatic cyclic anhydrides is initially charged in a reactor, and one or more H-functional starter substances are metered continuously into the reactor during the reaction.

EP-A 2 604 641 discloses a process for preparing polyether ester carbonate polyols by catalytic addition of carbon dioxide, alkylene oxides and cyclic anhydrides onto one or more H-functional starter substances in the presence of double metal cyanide (DMC) catalyst.

EP-A 2 604 642 has for its subject matter a process for preparing polyether carbonate polyols by catalytic addition of carbon dioxide and alkylene oxides onto one or more H-functional starter substances in the presence of double metal cyanide (DMC) catalyst, wherein, in a first activation stage, the DMC catalyst and at least one H-functional starter substance are initially charged and, in a second activation stage, the DMC catalyst is activated by addition of at least one alkylene oxide, $CO_2$ and at least one cyclic anhydride, and, in a third step [polymerization stage], at least one alkylene oxide and $CO_2$ are added.

BACKGROUND

It was therefore an object of the present invention to provide a process of the type specified at the outset, in which no H-functional starter substances need be initially charged in the reactor. Furthermore, the process was to enable the production of a product having a high content of incorporated $CO_2$ in the resulting polyetherester carbonate polyol.

The object was achieved by a process for preparing polyether ester carbonate polyols by adding at least one alkylene oxide, at least one cyclic anhydride and carbon dioxide onto one or more H-functional starter substances in the presence of a double metal cyanide catalyst ("DMC catalyst" for short), wherein the process is characterized in that (α) a suspension medium containing no H-functional groups is initially charged in a reactor and (γ) one or more H-functional starter substances is metered continuously into the reactor during the reaction and the metered addition of one or more alkylene oxides, the cyclic anhydride and optionally the carbon dioxide is effected simultaneously or sequentially.

DETAILED DESCRIPTION OF THE INVENTION

A suspension medium containing no H-functional groups is understood in the context of the present invention to mean a compound which is liquid at room temperature (25° C.) and at standard pressure (1013 hPa) or a mixture of compounds that are liquid under these conditions, where the compounds do not have any Zerewitinoff-active hydrogen atoms.

The anhydride(s) is/are preferably used in a total amount of ≥1% by weight to ≤50% by weight, preferably of ≥5% by weight to ≤20% by weight, based on the total amount of alkylene oxides metered in.

Step (α):

Preferably, in step (α), a suspension medium containing no H-functional groups is initially charged in the reactor, optionally together with DMC catalyst, without initially charging any H-functional starter substance in the reactor. Alternatively, it is also possible in step (α) to initially charge the reactor with a suspension medium containing no H-functional groups, and additionally a portion of the H-functional starter substances and optionally the DMC catalyst.

The DMC catalyst is preferably used in an amount such that the content of DMC catalyst in the resulting reaction product is 10 to 10 000 ppm, more preferably 20 to 5000 ppm, and most preferably 50 to 500 ppm.

In a preferred embodiment, inert gas (for example argon or nitrogen), an inert gas/carbon dioxide mixture or carbon dioxide is introduced into the resulting mixture of suspension medium and DMC catalyst at a temperature of 90° C. to 150° C., more preferably of 100° C. to 140° C., and at the same time a reduced pressure (absolute) of 10 mbar to 800 mbar, more preferably of 50 mbar to 200 mbar, is applied.

In an alternative preferred embodiment, the resulting mixture of suspension medium and DMC catalyst is contacted at least once, preferably three times, at a temperature of 90° C. to 150° C., more preferably of 100° C. to 140° C., with 1.5 bar to 10 bar (absolute), more preferably 3 bar to 6 bar (absolute), of an inert gas (for example argon or nitrogen), an inert gas/carbon dioxide mixture or carbon dioxide and then the gauge pressure is reduced in each case to about 1 bar (absolute).

The DMC catalyst can be added in solid form or as a suspension in a suspension medium or in a mixture of at least two suspension media. Preference is given to initially charge in the reactor with the suspension medium containing no H-functional groups together with DMC catalyst.

In a further preferred embodiment, in step (α), (α-I) the suspension medium or a mixture of at least two suspension media is initially charged and (α-II) the temperature of the suspension medium or the mixture of at least two suspension media is brought to 50 to 200° C., preferably 80 to 160° C., more preferably 100 to 140° C., and/or the pressure in the reactor is lowered to less than 500 mbar, preferably 5 mbar to 100 mbar, in the course of which an inert gas stream (for example of argon or nitrogen), an inert gas/carbon dioxide stream or a carbon dioxide stream is optionally passed through the reactor, wherein the double metal cyanide catalyst is added to the suspension medium and/or to the mixture of at least two suspension media in step (α-I) or immediately thereafter in step (α-II), and wherein the suspension medium contains no H-functional groups.

Step (β):

In a further configuration of the process of the invention, after step (α), a step (β) may be provided, in which a portion of alkylene oxide is added to the mixture from step (α) at temperatures of 90 to 150° C. and then the addition of the alkylene oxide compound is stopped. Step (β) serves to activate the DMC catalyst. This step may optionally be conducted under an inert gas atmosphere, under an atmosphere of inert gas/carbon dioxide mixture or under a carbon dioxide atmosphere.

Activation in the context of this invention refers to a step in which a portion of alkylene oxide compound or a portion of alkylene oxide compound and cyclic anhydride is added to the DMC catalyst suspension at temperatures of 90° C. to 150° C. and then the addition of the alkylene oxide compound and/or the cyclic anhydride is stopped, with observation of evolution of heat caused by a subsequent exothermic chemical reaction, which can lead to a temperature spike ("hotspot"), and of a pressure drop in the reactor caused by the conversion of alkylene oxide and optionally cyclic anhydride and $CO_2$.

The process step of activation is the period of time from the addition of the portion of alkylene oxide compound, optionally in the presence of cyclic anhydride and/or $CO_2$, to the DMC catalyst until the occurrence of the evolution of heat. Optionally, the portion of alkylene oxide compound can be added to the DMC catalyst in a plurality of individual steps, optionally in the presence of cyclic anhydride and/or $CO_2$, and then the addition of the alkylene oxide compound can be stopped in each case. In this case, the process step of activation comprises the period from the addition of the first portion of alkylene oxide compound, optionally in the presence of cyclic anhydride and/or $CO_2$, to the DMC catalyst until the occurrence of the evolution of heat after addition of the last portion of alkylene oxide compound. In general, the activation step may be preceded by a step for drying the DMC catalyst and optionally the H-functional starter compound at elevated temperature and/or reduced pressure, optionally with passage of an inert gas through the reaction mixture.

The metered addition of one or more alkylene oxides (and optionally of the cyclic anhydride and/or the carbon dioxide) can in principle be effected in different ways. The commencement of the metered addition can be effected from vacuum or at a previously chosen supply pressure. The supply pressure is preferably established by introduction of an inert gas (for example nitrogen or argon) or of carbon dioxide, where the pressure (in absolute terms) is 5 mbar to 100 bar, preferably 10 mbar to 50 bar and by preference 20 mbar to 50 bar.

In a preferred embodiment, the amount of one or more alkylene oxides used in the activation in step ($\beta$) is 0.1 to 25.0% by weight, preferably 1.0 to 20.0% by weight, especially preferably 2.0 to 16.0% by weight (based on the amount of suspension medium used in step ($\alpha$)). Optionally, a portion of the cyclic anhydride is metered in together with the alkylene oxide. The amount of cyclic anhydride used is preferably 0.1% to 10.0% by weight, preferably 0.5% to 7.0% by weight, more preferably 1.0% to 5.0% by weight (based on the amount of suspension medium used in step ($\alpha$)).

The alkylene oxide and optionally the cyclic anhydride can be added in one step or in two or more portions. Preferably, after addition of a portion of the alkylene oxide compound and optionally of the cyclic anhydride, the addition of the alkylene oxide compound and optionally of the cyclic anhydride is stopped until the occurrence of the evolution of heat and only then is the next portion of alkylene oxide compound and optionally cyclic anhydride added. In a preferred configuration of the process of the invention, the activation in step ($\beta$) is effected in two stages, wherein ($\beta$1) in a first activation stage a first portion of alkylene oxide and optionally cyclic anhydride is added under inert gas atmosphere and ($\beta$2) in a second activation stage a second portion of alkylene oxide and optionally cyclic anhydride is added under carbon dioxide atmosphere.

Step ($\gamma$):

The metered addition of one or more H-functional starter substance(s), one or more alkylene oxide(s), the cyclic anhydride and optionally the carbon dioxide can be effected simultaneously or sequentially (in portions). Preferably, the metered addition of the one or more H-functional starter substances into the reactor during the reaction is effected continuously, and at least one alkylene oxide, at least one cyclic anhydride and optionally the carbon dioxide are metered into the reactor simultaneously or sequentially (in portions) during the reaction. More preferably, the metered addition of the one or more H-functional starter substances, the at least one alkylene oxide, the at least one cyclic anhydride and the carbon dioxide into the reactor is effected simultaneously and continuously during the reaction. For example, the total amount of carbon dioxide, the amount of H-functional starter substances and/or the amount of alkylene oxides and cyclic anhydride metered in step ($\gamma$) can be added all at once or continuously. The term "continuously" used here can be defined as a mode of addition of a reactant such that a concentration of the reactant effective for the copolymerization is maintained, meaning that the metered addition can be effected, for example, with a constant metering rate, with a varying metering rate or in portions.

The term "copolymerization" is understood in the context of the present invention to mean the polymerization of at least two different monomeric compounds, i.e. including the polymerization of three different monomers, which is referred to universally as "terpolymerization", or else the polymerization of four or more different monomers.

It is possible, during the addition of the alkylene oxide, the cyclic anhydride and/or the H-functional starter substances, to increase or lower the $CO_2$ pressure gradually or stepwise or to leave it constant. Preferably, the total pressure is kept constant during the reaction by metered addition of further carbon dioxide. The metered addition of one or more alkylene oxide(s) and/or the one or more H-functional starter substance(s) is effected simultaneously or sequentially with respect to the metered addition of carbon dioxide.

It is possible to meter in the alkylene oxide and/or the cyclic anhydride at a constant metering rate, or to increase or lower the metering rate gradually or stepwise, or to add the alkylene oxide and/or the cyclic anhydride in portions. Preferably, the alkylene oxide and/or the cyclic anhydride is added to the reaction mixture at a constant metering rate. If a plurality of alkylene oxides and/or cyclic anhydrides are used for synthesis of the polyether ester carbonate polyols, the alkylene oxides and/or the cyclic anhydrides can be metered in individually or as a mixture.

The addition of the alkylene oxide and the cyclic anhydride is preferably effected via separate metering sites. However, it is also possible to meter in a mixture of alkylene oxide and cyclic anhydride. The metered addition of the alkylene oxides and/or of the H-functional starter substances can be effected simultaneously or sequentially, each via separate metering points (addition points), or via one or more metering points, in which case the alkylene oxides and/or the H-functional starter substances can be metered in individually or as a mixture. It is possible via the manner and/or sequence of the metered addition of the H-functional starter substances, the alkylene oxides, the cyclic anhydride and/or the carbon dioxide to synthesize random, alternating, block or gradient polyether ester carbonate polyols.

In a preferred embodiment, in step ($\gamma$), the metered addition of the one or more H-functional starter substance(s) is ended at a juncture prior to the addition of the alkylene oxide and/or the cyclic anhydride.

Preferably, an excess of carbon dioxide is used, based on the calculated amount of carbon dioxide incorporated in the polyether ester carbonate polyol, since an excess of carbon dioxide is advantageous because of the low reactivity of carbon dioxide. The amount of carbon dioxide can be fixed via the total pressure under the respective reaction conditions. An advantageous total pressure (in absolute terms) for the copolymerization for preparation of the polyether ester carbonate polyols has been found to be in the range from 0.01 to 120 bar, preferably 0.1 to 110 bar, more preferably from 1 to 100 bar. It is possible to feed in the carbon dioxide continuously or discontinuously. This depends on how quickly the alkylene oxides are consumed and whether the product is supposed to contain any $CO_2$-free polyether blocks. The amount of the carbon dioxide (reported as pressure) can likewise vary in the course of addition of the alkylene oxides. $CO_2$ can also be added to the reactor in solid form and then be converted under the selected reaction conditions to the gaseous, dissolved, liquid and/or supercritical state.

One characteristic feature of a preferred embodiment of the process of the invention is that, in step (γ), the total amount of the one or more H-functional starter substance(s) is added. This addition can be effected at a constant metering rate, at a varying metering rate or in portions.

For the process of the invention, it has additionally been found that the copolymerization (step (γ)) for preparation of the polyether ester carbonate polyols is conducted advantageously at 50° C. to 150° C., preferably at 60° C. to 145° C., more preferably at 70° C. to 140° C. and most preferably at 90° C. to 130° C. If temperatures below 50° C. are set, the reaction generally becomes very slow. At temperatures above 150° C., there is a sharp rise in the quantity of unwanted by-products.

The metered addition of the alkylene oxide, the cyclic anhydride, the H-functional starter compound and the DMC catalyst can be effected via separate or combined metering points. In a preferred embodiment, the alkylene oxide and the H-functional starter compound are metered continuously into the reaction mixture via separate metering points. This addition of the one or more H-functional starter substance(s) can be effected as a continuous metered addition into the reactor or in portions.

Steps (α), (β) and (γ) can be performed in the same reactor, or each can be performed separately in different reactors. Particularly preferred reactor types are: tubular reactors, stirred tanks, loop reactors.

Polyether ester carbonate polyols can be prepared in a stirred tank, in which case the stirred tank, according to the design and mode of operation, is cooled via the reactor shell, internal cooling surfaces and/or cooling surfaces within a pumped circulation system. Both in semi-batchwise application, in which the product is not removed until after the end of the reaction, and in continuous application, in which the product is removed continuously, particular attention should be paid to the metering rate of the alkylene oxide. This should be set such that, in spite of the inhibiting action of the carbon dioxide, the alkylene oxides are depleted quickly enough. The concentration of free alkylene oxides in the reaction mixture during the activation step (step (β)) is preferably >0 to 100% by weight, especially preferably >0 to 50% by weight, most preferably >0 to 20% by weight (based in each case on the weight of the reaction mixture). The concentration of free alkylene oxides in the reaction mixture during the reaction (step γ) is preferably >0% to 40% by weight, more preferably >0% to 25% by weight, most preferably >0% to 15% by weight (based in each case on the weight of the reaction mixture).

In a preferred embodiment, the activated DMC catalyst/suspension medium mixture that results from steps (α) and (β) is reacted further in the same reactor with one or more alkylene oxide(s), one or more starter substance(s) and carbon dioxide. In a further preferred embodiment, the activated DMC catalyst/suspension medium mixture that results from steps (α) and (β) is reacted further with alkylene oxides, one or more starter substance(s) and carbon dioxide in another reaction vessel (for example a stirred tank, tubular reactor or loop reactor).

In the case of a reaction conducted in a tubular reactor, the activated DMC catalyst/suspension medium mixture that results from steps (α) and (β), one or more H-functional starter substance(s), one or more alkylene oxide(s) and carbon dioxide are pumped continuously through a tube. The molar ratios of the co-reactants vary according to the desired polymer. In a preferred embodiment, carbon dioxide is metered in here in its liquid or supercritical form, in order to enable optimal miscibility of the components. Advantageously, mixing elements for better mixing of the co-reactants are installed, as sold, for example, by Ehrfeld Mikrotechnik BTS GmbH, or mixer-heat exchanger elements which simultaneously improve the mixing and heat removal.

Loop reactors can likewise be used for preparation of polyether ester carbonate polyols. These generally include reactors having recycling of matter, for example a jet loop reactor, which can also be operated continuously, or a tubular reactor designed in the form of a loop with suitable apparatuses for the circulation of the reaction mixture, or a loop of several series-connected tubular reactors. The use of a loop reactor is advantageous especially because backmixing can be achieved here, such that it is possible to keep the concentration of free alkylene oxides in the reaction mixture within the optimal range, preferably in the range from >0% to 40% by weight, more preferably >0% to 25% by weight, most preferably >0% to 15% by weight (based in each case on the weight of the reaction mixture).

Preferably, the polyether ester carbonate polyols are prepared in a continuous process which comprises both a continuous copolymerization and a continuous addition of the one or more H-functional starter substance(s).

The invention therefore also provides a process wherein, in step (γ), one or more H-functional starter substance(s), one or more alkylene oxide(s), cyclic anhydride and DMC catalyst are metered continuously into the reactor in the presence of carbon dioxide ("copolymerization"), and wherein the resulting reaction mixture (comprising the reaction product) is removed continuously from the reactor. In this case, in step (γ), the DMC catalyst is preferably added continuously in suspension in H-functional starter compound.

For example, for the continuous process for preparing the polyether ester carbonate polyols in steps (α) and (β), an activated DMC catalyst/suspension medium mixture is prepared, then, in step (γ), (γ1) a portion each of one or more H-functional starter substance(s), one or more alkylene oxide(s) and carbon dioxide are metered in to initiate the copolymerization, and (γ2) during the progress of the copolymerization, the remaining amount of each of DMC catalyst, one or more starter substance(s) and alkylene oxide(s) is metered in continuously in the presence of carbon dioxide, with simultaneous continuous removal of resulting reaction mixture from the reactor.

In step (γ), the DMC catalyst is preferably added suspended in the H-functional starter compound, the amount preferably being chosen such that the content of DMC catalyst in the resulting reaction product is 10 to 10 000 ppm, more preferably 20 to 5000 ppm, and most preferably 50 to 500 ppm.

Preferably, steps (α) and (β) are conducted in a first reactor, and the resulting reaction mixture is then transferred into a second reactor for the copolymerization in step (γ). However, it is also possible to conduct steps (α), (β) and (γ) in one reactor.

It has also been found that the process of the present invention can be used for preparation of large amounts of the polyether ester carbonate polyol, in which case a DMC catalyst activated according to steps (α) and (β) in a suspension medium is initially used, and the DMC catalyst is added without prior activation during the copolymerization (γ).

A particularly advantageous feature of the preferred embodiment of the present invention is thus the ability to use "fresh" DMC catalysts without activation of the portion of DMC catalyst which is added continuously in step (γ). An activation of DMC catalysts to be conducted analogously to step (β) does not just involve additional attention from the operator, which results in an increase in the manufacturing costs, but also requires a pressurized reaction vessel, which also results in an increase in the capital costs in the construction of a corresponding production plant. Here, "fresh" catalyst is defined as unactivated DMC catalyst in solid form or in the form of a slurry in a suspension medium or starter substance. The ability of the present process to use fresh unactivated DMC catalyst in step (γ) enables significant savings in the commercial preparation of polyether ester carbonate polyols and is a preferred embodiment of the present invention.

The term "continuously" used here can be defined as the mode of addition of a relevant catalyst or reactant such that an effective concentration of the DMC catalyst or the reactant is maintained in an essentially continuous manner. The catalyst can be fed in a truly continuous manner or in relatively closely spaced increments. Equally, a continuous addition of starter can be effected in a truly continuous manner or in increments. There would be no departure from the present process in adding a DMC catalyst or reactants incrementally such that the concentration of the materials added drops essentially to zero for a period of time before the next incremental addition. However, it is preferable for the DMC catalyst concentration to be kept substantially at the same concentration during the main portion of the course of the continuous reaction, and for starter substance to be present during the main portion of the copolymerization process. An incremental addition of DMC catalyst and/or reactant which essentially does not affect the nature of the product is nevertheless "continuous" in that sense in which the term is being used here. One feasible option is, for example, to provide a recycling loop in which a portion of the reacting mixture is recycled to a prior point in the process, as a result of which discontinuities brought about by incremental additions are smoothed out.

Step (δ)

In an optional step (δ) the reaction mixture continuously removed in step (γ) which generally has an alkylene oxide content of from 0.05% by weight to 10% by weight may be transferred into a postreactor in which, by way of a post-reaction, the content of free alkylene oxide is reduced to less than 0.05% by weight in the reaction mixture. The postreactor may be a tubular reactor, a loop reactor or a stirred tank for example.

The pressure in this postreactor is preferably at the same pressure as in the reaction apparatus in which reaction step (γ) is performed. The pressure in the downstream reactor can, however, also be selected at a higher or lower level. In a further preferred embodiment, the carbon dioxide, after reaction step (γ), is fully or partly released and the downstream reactor is operated at standard pressure or a slightly elevated pressure. The temperature in the downstream reactor is preferably 50° C. to 150° C. and more preferably 80° C. to 140° C.

In the process of the invention, a suspension medium containing no H-functional groups is first initially charged in the reactor. Subsequently, the amount of DMC catalyst required for the polyaddition, which is preferably unactivated, is introduced into the reactor. The sequence of addition is not crucial. It is also possible first to introduce the DMC catalyst and then the suspension medium into the reactor. Alternatively, it is also possible first to suspend the DMC catalyst in the inert suspension medium and then to introduce the suspension into the reactor. The suspension medium provides a sufficient heat transfer area with the reactor wall or cooling elements installed in the reactor, such that the heat of reaction released can be removed very efficiently. Moreover, the suspension medium, in the event of a cooling failure, provides heat capacity, such that the temperature in this case can be kept below the breakdown temperature of the reaction mixture.

Any suspension media used in accordance with the invention do not contain any H-functional groups. Suitable suspension media are all polar aprotic, weakly polar aprotic and nonpolar aprotic solvents, none of which contain any H-functional groups. As suspension medium it is also possible to use a mixture of two or more of these suspension media. The following polar aprotic solvents are mentioned here by way of example: 4-methyl-2-oxo-1,3-dioxolane (also referred to hereinafter as cyclic propylene carbonate or cPC), 1,3-dioxolan-2-one (also referred to hereinafter as cyclic ethylene carbonate or cEC), acetone, methyl ethyl ketone, acetonitrile, nitromethane, dimethyl sulfoxide, sulfolane, dimethylformamide, dimethylacetamide and N-methylpyrrolidone. The group of the nonpolar and weakly polar aprotic solvents includes, for example, ethers, for example dioxane, diethyl ether, methyl tert-butyl ether and tetrahydrofuran, esters, for example ethyl acetate and butyl acetate, hydrocarbons, for example pentane, n-hexane, benzene and alkylated benzene derivatives (e.g. toluene, xylene, ethylbenzene) and chlorinated hydrocarbons, for example chloroform, chlorobenzene, dichlorobenzene and carbon tetrachloride. Preferred suspension media used are 4-methyl-2-oxo-1,3-dioxolane, 1,3-dioxolan-2-one, toluene, xylene, ethylbenzene, chlorobenzene and dichlorobenzene, and mixtures of two or more of these suspension media; particular preference is given to 4-methyl-2-oxo-1,3-dioxolane and 1,3-dioxolan-2-one or a mixture of 4-methyl-2-oxo-1,3-dioxolane and 1,3-dioxolan-2-one.

Likewise suitable as suspension media containing no H-functional groups are compounds selected from the group consisting of aliphatic lactones, aromatic lactones, lactides, cyclic carbonates having at least three optionally substituted methylene groups between the oxygen atoms of the carbonate group. These are also incorporated into the polyetherester carbonate polyol obtained after addition of the H-functional starter substance. The suspension medium used may also be a mixture of two or more of the suspension media mentioned.

Aliphatic or aromatic lactones in the context of the invention are cyclic compounds containing an ester bond in the ring, preferably compounds of the formulae (II), (III) or (IV),

(II)

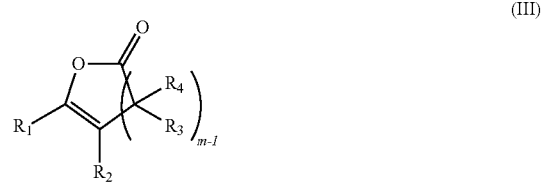

(III)

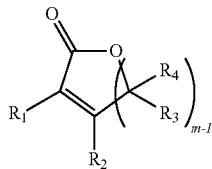

(IV)

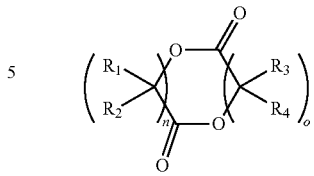

(V)

where

R1, R2, R3 and R4 are each independently hydrogen, a linear or branched C1 to C22 alkyl radical optionally containing heteroatoms, a linear or branched, mono- or polyunsaturated C1 to C22 alkenyl radical optionally containing heteroatoms or an optionally mono- or polysubstituted C6 to C18 aryl radical optionally containing heteroatoms, or may be members of a saturated or unsaturated 4- to 7-membered ring or polycyclic ring system optionally containing heteroatoms and/or ether groups, where the compounds of the formula (II) may also be substituted by chlorine, bromine, nitro groups or alkoxy groups, m is an integer greater than or equal to 1, preferably 1, 2, 3 or 4, and R3 and R4 in repeat units (m>1) may each be different.

Preferred compounds of the formulae (II), (III) or (IV) are 4-membered lactone rings such as β-propiolactone, β-butyrolactone, β-isovalerolactone, β-caprolactone, β-isocaprolactone, β-methyl-β-valerolactone, 5-membered lactone rings such as γ-butyrolactone, γ-valerolactone, 5-methylfuran-2(3H)-one, 5-methylidenedihydrofuran-2(3H)-one, 5-hydroxyfuran-2(5H)-one, 2-benzofuran-1(3H)-one and 6-methyl-2-benzofuran-1(3H)-one, 6-membered lactone rings such as δ-valerolactone, 1,4-dioxan-2-one, dihydrocoumarin, 1H-isochromen-1-one, 8H-pyrano[3,4-b]pyridine-8-one, 1,4-dihydro-3H-isochromen-3-one, 7,8-dihydro-5H-pyrano[4,3-b]pyridine-5-one, 4-methyl-3,4-dihydro-1H-pyrano[3,4-b]pyridine-1-one, 6-hydroxy-3,4-dihydro-1H-isochromen-1-one, 7-hydroxy-3,4-dihydro-2H-chromen-2-one, 3-ethyl-1H-isochromen-1-one, 3-(hydroxymethyl)-1H-isochromen-1-one, 9-hydroxy-1H,3H-benzo[de]isochromen-1-one, 6,7-dimethoxy-1,4-dihydro-3H-isochromen-3-one and 3-phenyl-3,4-dihydro-1H-isochromen-1-one, 7-membered lactone rings, such as ε-caprolactone, 1,5-dioxepan-2-one, 5-methyloxepan-2-one, oxepane-2,7-dione, thiepan-2-one, 5-chlorooxepan-2-one, (4S)-4-(propan-2-yl)oxepan-2-one, 7-butyloxepan-2-one, 5-(4-aminobutyl)oxepan-2-one, 5-phenyloxepan-2-one, 7-hexyloxepan-2-one, (5S,7S)-5-methyl-7-(propan-2-yl)oxepan-2-one, 4-methyl-7-(propan-2-yl)oxepan-2-one, lactone rings having higher numbers of members, such as (7E)-oxacycloheptadec-7-en-2-one.

Particular preference is given to ε-caprolactone and dihydrocoumarin.

Lactides in the context of the invention are cyclic compounds containing two or more ester bonds in the ring, preferably compounds of the formula (V)

where R1, R2, R3 and R4 are each as defined above, and n and o are each independently an integer greater than or equal to 1, preferably 1, 2, 3 or 4, and R1 and R2 in repeat units (n>1) and R3 and R4 in repeat units (o>1) may each be different.

Preferred compounds of the formulae (V) are glycolide (1,4-dioxane-2,5-dione), L-lactide (L-3,6-dimethyl-1,4-dioxane-2,5-dione), D-lactide, DL-lactide, mesolactide and 3-methyl-1,4-dioxane-2,5-dione, 3-hexyl-6-methyl-1,4-dioxane-2,5-diones, 3,6-di(but-3-en-1-yl)-1,4-dioxane-2,5-dione (in each case inclusive of optically active forms). Particular preference is given to L-lactide.

Cyclic carbonates having at least three optionally substituted methylene groups between the oxygen atoms of the carbonate group that are used are preferably compounds of the formula (VI)

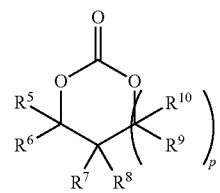

(VI)

where

R5, R6, R7, R8, R9 and R10 are each independently hydrogen, a linear or branched C1 to C22 alkyl radical optionally containing heteroatoms, a linear or branched, mono- or polyunsaturated C1 to C22 alkenyl radical optionally containing heteroatoms or an optionally mono- or polysubstituted C6 to C18 aryl radical optionally containing heteroatoms, or may be members of a saturated or unsaturated 4- to 7-membered ring or polycyclic system optionally containing heteroatoms, p is an integer greater than or equal to 1, preferably 1, 2 or 3, and R9 and R10 in repeat units (p>1) may each be different, and where the compounds of the formula (VI) may also be substituted by chlorine, bromine, nitro groups or alkoxy groups.

Preferred compounds of the formula (VI) are trimethylene carbonate, neopentyl glycol carbonate (5,5-dimethyl-1,3-dioxan-2-one), 2,2,4-trimethyl-1,3-pentanediol carbonate, 2,2-dimethyl-1,3-butanediol carbonate, 1,3-butanediol carbonate, 2-methyl-1,3-propanediol carbonate, 2,4-pentanediol carbonate, 2-methylbutane-1,3-diol carbonate, TMP monoallyl ether carbonate, pentaerythritol diallyl ether carbonate, 5-(2-hydroxyethyl)-1,3-dioxan-2-one, 5-[2-(benzyloxy)ethyl]-1,3-dioxan-2-one, 4-ethyl-1,3-dioxolan-2-one, 1,3-dioxolan-2-one, 5-ethyl-5-methyl-1,3-dioxan-2-one, 5,5-diethyl-1,3-dioxan-2-one, 5-methyl-5-propyl-1,3-dioxan-2-one, 5-(phenylamino)-1,3-dioxan-2-one and 5,5- dipropyl-1,3-dioxan-2-one. Particular preference is given to trimethylene carbonate and neopentyl glycol carbonate.

Cyclic carbonates having fewer than three optionally substituted methylene groups between the oxygen atoms of the carbonate group can likewise be used as suspension media, optionally together with suspension media from the group consisting of polar aprotic, weakly polar aprotic and nonpolar aprotic solvents, aliphatic lactones, aromatic lactones, lactides, cyclic carbonates having at least three optionally substituted methylene groups between the oxygen atoms of the carbonate group, aliphatic cyclic anhydrides and aromatic cyclic anhydrides. Preferred cyclic carbonates having fewer than three optionally substituted methylene groups between the oxygen atoms of the carbonate group are 4-methyl-2-oxo-1,3-dioxolane, 1,3-dioxolan-2-one, 2,3-butanediol carbonate, 2,3-pentanediol carbonate, 2-methyl-1,2-propanediol carbonate and 2,3-dimethyl-2,3-butanediol carbonate. Without being bound to a theory, cyclic carbonates having fewer than three optionally substituted methylene groups between the oxygen atoms of the carbonate group, under the conditions of the process of the invention for the copolymerization of epoxides and $CO_2$, are incorporated into the polymer chain only to a small extent, if at all.

The polyether ester carbonate polyols obtained in accordance with the invention have a functionality of, for example, at least 1, preferably of 1 to 8, more preferably of 1 to 6 and most preferably of 2 to 4. The molecular weight is preferably 400 to 10 000 g/mol and more preferably 500 to 6000 g/mol.

In general, for the process of the invention, it is possible to use alkylene oxides (epoxides) having 2-24 carbon atoms. The alkylene oxides having 2-24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidized fats as mono-, di- and triglycerides, epoxidized fatty acids, $C_1$-$C_{24}$ esters of epoxidized fatty acids, epichlorohydrin, glycidol, and derivatives of glycidol, for example methyl glycidyl ether, ethyl glycidyl ether, 2-ethylhexyl glycidyl ether, allyl glycidyl ether, glycidyl methacrylate and epoxy-functional alkoxysilanes, for example 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preferably, the alkylene oxides used are ethylene oxide and/or propylene oxide, especially propylene oxide.

The cyclic anhydrides used are preferably compounds of the formula (VII), (VIII) or (IX)

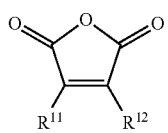

(VII)

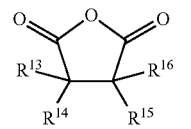

(VIII)

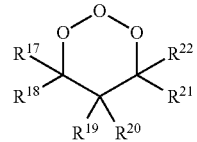

(IX)

where

R11 and R12 are hydrogen, halogen, linear or branched C1-C22-alkyl optionally containing heteroatoms, linear or branched mono- or polyunsaturated C1-C22-alkenyl optionally containing heteroatoms or optionally mono- or polysubstituted C6-C18-aryl substituents optionally containing heteroatoms, or R11 and R12 may be members of a saturated or unsaturated 4 to 7-membered ring or polycyclic system optionally containing heteroatoms, and R11 and R12 together preferably give a benzene ring, R13, R14, R15 and R16 are hydrogen, linear or branched C1-C22-alkyl substituents optionally containing heteroatoms, linear or branched mono- or polyunsaturated C1-C22-alkenyl substituents optionally containing heteroatoms or optionally mono- or polysubstituted C6-C18-aryl substituents optionally containing heteroatoms, or may be members of a saturated or unsaturated 4- to 7-membered ring or polycyclic system optionally containing heteroatoms and R17, R18, R19, R20, R21 and R22 are hydrogen, linear or branched C1-C22-alkyl substituents optionally containing heteroatoms, linear or branched mono- or polyunsaturated C1-C22-alkenyl substituents optionally containing heteroatoms or optionally mono- or polysubstituted C6-C18-aryl substituents optionally containing heteroatoms, or may be members of a saturated or unsaturated 4- to 7-membered ring or polycyclic system optionally containing heteroatoms, and where the compounds of the formula (VII) and (VIII) and (IX) may also be substituted by chlorine, bromine, nitro groups or alkoxy groups.

Preferred compounds of the formula (VII), (VIII) or (IX) are succinic anhydride, maleic anhydride, phthalic anhydride, cyclohexane-1,2-dicarboxylic anhydride, diphenic anhydride, tetrahydrophthalic anhydride, methyltetrahydrophthalic anhydride, norbornenedioic anhydride and chlorination products thereof, succinic anhydride, glutaric anhydride, diglycolic anhydride, 1,8-naphthalic anhydride, succinic anhydride, dodecenylsuccinic anhydride, tetradecenylsuccinic anhydride, hexadecenylsuccinic anhydride, octadecenylsuccinic anhydride, 3- and 4-nitrophthalic anhydride, tetrachlorophthalic anhydride, tetrabromophthalic anhydride, itaconic anhydride, dimethylmaleic anhydride, allylnorbornenedioic anhydride, 3-methylfuran-2,5-dione, 3-methyldihydrofuran-2,5-dione, dihydro-2H-pyran-2,6 (3H)-dione, 1,4-dioxane-2,6-dione, 2H-pyran-2,4,6(3H, 5H)-trione, 3-ethyldihydrofuran-2,5-dione, 3-methoxydihydrofuran-2,5-dione, 3-(prop-2-en-1-yl) dihydrofuran-2,5-dione, N-(2,5-dioxotetrahydrofuran-3-yl)formamide and 3[(2E)-but-2-en-1-yl]dihydrofuran-2,5-dione. Succinic anhydride, maleic anhydride and phthalic anhydride are particularly preferred.

Suitable H-functional starter substances ("starters") used may be compounds having alkoxylation-active hydrogen atoms and having a molar mass of 18 to 4500 g/mol, preferably of 62 to 500 g/mol and more preferably of 62 to 182 g/mol. The ability to use a starter having a low molar mass is a distinct advantage over the use of oligomeric starters prepared by means of a prior alkoxylation. In particular, a level of economic viability is achieved that is made possible by the omission of a separate alkoxylation process.

Groups active in respect of the alkoxylation and having active hydrogen atoms are, for example, —OH, —NH$_2$ (primary amines), —NH— (secondary amines), —SH, and —CO$_2$H, preferably —OH and —NH$_2$, more preferably —OH. H-Functional starter substances used are, for example, one or more compounds selected from the group consisting of mono- and polyhydric alcohols, polyfunctional amines, polyfunctional thiols, amino alcohols, thio alcohols, hydroxy esters, polyether polyols, polyester polyols, polyester ether polyols, polyethercarbonate polyols, polycarbonate polyols, polycarbonates, polyethyleneimines, polyetheramines, polytetrahydrofurans (e.g. PolyTHF® from BASF), polytetrahydrofuranamines, polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$ alkyl fatty acid esters containing an average of at least 2 OH groups per molecule. By way of example, the $C_1$-$C_{24}$ alkyl fatty acid esters containing an average of at least 2 OH groups per molecule are commercial products such as Lupranol Balance® (from BASF AG), Merginol® products (from Hobum Oleochemicals GmbH), Sovermol® products (from Cognis Deutschland GmbH & Co. KG) and Soyol®TM products (from USSC Co.).

Monofunctional starter substances used may be alcohols, amines, thiols and carboxylic acids. Monofunctional alcohols used may be: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. Useful monofunctional amines include: butylamine, tert-butylamine, pentylamine, hexylamine, aniline, aziridine, pyrrolidine, piperidine, morpholine. Monofunctional thiols used may be: ethanethiol, 1-propanethiol, 2-propanethiol, 1-butanethiol, 3-methyl-1-butanethiol, 2-butene-1-thiol, thiophenol. Monofunctional carboxylic acids include: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (for example ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (for example 3-methyl-1,5-pentanediol), 1,6-hexanediol, 1,8-octanediol, 1,10-decanediol, 1,12-dodecanediol, bis(hydroxymethyl)cyclohexanes (for example 1,4-bis(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (for example trimethylolpropane, glycerol, trishydroxyethyl isocyanurate, castor oil); tetrahydric alcohols (for example pentaerythritol); polyalcohols (for example sorbitol, hexitol, sucrose, starch, starch hydrolyzates, cellulose, cellulose hydrolyzates, hydroxy-functionalized fats and oils, especially castor oil), and all the modification products of these aforementioned alcohols with different amounts of ε-caprolactone.

The H-functional starter substances may also be selected from the substance class of the polyether polyols having a molecular weight $M_n$ in the range from 18 to 4500 g/mol and a functionality of 2 to 3. Preference is given to polyether polyols formed from repeat ethylene oxide and propylene oxide units, preferably having a proportion of propylene oxide units of 35% to 100%, particularly preferably having a proportion of propylene oxide units of 50% to 100%. These may be random copolymers, gradient copolymers, alternating copolymers or block copolymers of ethylene oxide and propylene oxide.

The H-functional starter substances may also be selected from the substance class of the polyester polyols. The polyester polyols used are at least difunctional polyesters. Preferably, polyester polyols consist of alternating acid and alcohol units. Acid components used are, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the acids and/or anhydrides mentioned. Alcohol components used are, for example, ethanediol, propane-1,2-diol, propane-1,3-diol, butane-1,4-diol, pentane-1,5-diol, neopentyl glycol, hexane-1,6-diol, 1,4-bis(hydroxymethyl)cyclohexane, diethylene glycol, dipropylene glycol, trimethylolpropane, glycerol, pentaerythritol or mixtures of the alcohols mentioned. If the alcohol components used are dihydric or polyhydric polyether polyols, the result is polyester ether polyols which can likewise serve as starter substances for preparation of the polyether ester carbonate polyols.

In addition, H-functional starter substances used may be polycarbonate diols which are prepared, for example, by reaction of phosgene, dimethyl carbonate, diethyl carbonate or diphenyl carbonate and difunctional alcohols or polyester polyols or polyether polyols. Examples of polycarbonates may be found, for example, in EP-A 1359177.

In a further embodiment of the invention, it is possible to use polyether ester carbonate polyols as H-functional starter substances. More particularly, polyether ester carbonate polyols obtainable by the process according to the invention described here are used. For this purpose, these polyether ester carbonate polyols used as H-functional starter substances are prepared in a separate reaction step beforehand.

The H-functional starter substances generally have a functionality (i.e. the number of hydrogen atoms active in respect of the polymerization per molecule) of 1 to 8, preferably of 2 or 3. The H-functional starter substances are used either individually or as a mixture of at least two H-functional starter substances.

More preferably, the H-functional starter substances are one or more compounds selected from the group consisting of ethylene glycol, propylene glycol, propane-1,3-diol, butane-1,3-diol, butane-1,4-diol, pentane-1,5-diol, 2-methylpropane-1,3-diol, neopentyl glycol, hexane-1,6-diol, octane-1,8-diol, diethylene glycol, dipropylene glycol, glycerol, trimethylolpropane, pentaerythritol, sorbitol and polyether polyols having a molecular weight Mn in the range from 150 to 4500 g/mol and a functionality of 2 to 3.

The polyether ester carbonate polyols are prepared by catalytic addition of carbon dioxide and alkylene oxides onto H-functional starter substances. In the context of the invention, "H-functional" is understood to mean the number of alkoxylation-active hydrogen atoms per molecule of the starter substance.

DMC catalysts for use in the homopolymerization of alkylene oxides are known in principle from the prior art (see, for example, U.S. Pat. No. 3,404,109, U.S. Pat. No. 3,829,505, U.S. Pat. No. 3,941,849 and U.S. Pat. No. 5,158,922). DMC catalysts, which are described, for example, in U.S. Pat. No. 5,470,813, EP-A 700 949, EP-A 743 093, EP-A 761 708, WO 97/40086, WO 98/16310 and WO 00/47649, have a very high activity and enable the preparation of polyether ester carbonate polyols at very low catalyst concentrations, such that a removal of the catalyst from the finished product is generally no longer required. A typical example is that of the highly active DMC catalysts which are described in EP-A 700 949 and contain not only a double metal cyanide compound (e.g. zinc hexacyanocobaltate(III)) and an organic complex ligand (e.g. tert-butanol) but also a polyether having a number-average molecular weight greater than 500 g/mol.

The inventive DMC catalysts are preferably obtained by
(i) reacting an aqueous solution of a metal salt with the aqueous solution of a metal cyanide salt in the presence of one or more organic complex ligands, e.g. an ether or alcohol, in a first step,
(ii) removing the solid from the suspension obtained from (i) by known techniques (such as centrifugation or filtration) in a second step,
(iii) optionally washing the isolated solid with an aqueous solution of an organic complex ligand (for example by resuspending and subsequent reisolating by filtration or centrifugation) in a third step,
(iv) then drying the solid obtained at temperatures of in general 20-120° C. and at pressures of in general 0.1 mbar to atmospheric pressure (1013 mbar), optionally after pulverizing, wherein in the first step or immediately after the precipitation of the double metal cyanide compound (second step) one or more organic complex ligands, preferably in excess (based on the double metal cyanide compound), and optionally further complex-forming components are added.

The double metal cyanide compounds present in the inventive DMC catalysts are the reaction products of water-soluble metal salts and water-soluble metal cyanide salts.

For example, an aqueous solution of zinc chloride (preferably in excess based on the metal cyanide salt, for example potassium hexacyanocobaltate) and potassium hexacyanocobaltate are mixed and dimethoxyethane (glyme) or tert-butanol (preferably in excess based on zinc hexacyanocobaltate) is then added to the suspension formed.

Metal salts suitable for preparation of the double metal cyanide compounds preferably have the general formula (X)

$$M(X)_n \qquad (X)$$

where
M is selected from the metal cations $Zn^{2+}$, $Fe^{2+}$, $Ni^{2+}$, $MN^{2+}$, $Co^{2-}$, $Sr^{2+}$, $Sn^{2+}$, $Pb^{2+}$ and $Cu^{2+}$; M is preferably $Zn^{2+}$, $Fe^{2+}$, $Co^{2+}$ or $Ni^{2+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
n is 1 when X=sulfate, carbonate or oxalate and
n is 2 when X=halide, hydroxide, carboxylate, cyanate, thiocyanate, isocyanate, isothiocyanate or nitrate, or suitable metal salts have the general formula (XI)

$$M_r(X)_3 \qquad (XI)$$

where
M is selected from the metal cations $Fe^{3+}$, $Al^{3-}$, $Co^{3+}$ and $Cr^{3+}$, X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
r is 2 when X=sulfate, carbonate or oxalate and
r is 1 when X=halide, hydroxide, carboxylate, cyanate, thiocyanate, isocyanate, isothiocyanate or nitrate, or suitable metal salts have the general formula (XII)

$$M(X)_s \qquad (XII)$$

where
M is selected from the metal cations $Mo^{4+}$, $V^{4+}$ and $W^{4-}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate and
s is 4 when X=halide, hydroxide, carboxylate, cyanate, thiocyanate, isocyanate, isothiocyanate or nitrate, or suitable metal salts have the general formula (XIII)

$$M(X)_t \qquad (XIII)$$

where
M is selected from the metal cations $Mo^{6+}$ and $W^{6+}$,

X are one or more (i.e. different) anions, preferably an anion selected from the group of halides (i.e. fluoride, chloride, bromide, iodide), hydroxide, sulfate, carbonate, cyanate, thiocyanate, isocyanate, isothiocyanate, carboxylate, oxalate and nitrate;
t is 3 when X=sulfate, carbonate or oxalate and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron(II) chloride, iron(III) chloride, cobalt(II) chloride, cobalt(II) thiocyanate, nickel(II) chloride and nickel(II) nitrate. It is also possible to use mixtures of different metal salts.

Metal cyanide salts suitable for preparation of the double metal cyanide compounds preferably have the general formula (XIV)

$$(Y)_a M'(CN)_b (A)_c \qquad (XIV)$$

where
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V); M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^-$, $Na^+$, $K^+$, $Rb^-$) and alkaline earth metal (i.e. $Be^{2+}$, $Mg^{2+}$, $Ca^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate and nitrate, and a, b and c are integers, where the values of a, b and c are chosen so as to ensure electronic neutrality of the metal cyanide salt; a is preferably 1, 2, 3 or 4; b is preferably 4, 5 or 6; c preferably has a value of 0.

Examples of suitable metal cyanide salts are sodium hexacyanocobaltate(III), potassium hexacyanocobaltate (III), potassium hexacyanoferrate(II), potassium hexacyanoferrate(III), calcium hexacyanocobaltate(III) and lithium hexacyanocobaltate(III).

Preferred double metal cyanide compounds present in the inventive DMC catalysts are compounds of the general formula (XV)

$$M_x[M'_{x'}(CN)_y]_z \qquad (XV)$$

in which M is defined as in formula (X) to (XIII) and M' is as defined in formula (XIV), and x, x', y and z are integers and are chosen so as to ensure electronic neutrality of the double metal cyanide compound.

Preferably, x=3, x'=1, y=6 and z=2,

M=Zn(II), Fe(II), Co(II) or Ni(II) and

M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate(III). Further examples of suitable double metal cyanide compounds can be found, for example, in U.S. Pat. No. 5,158,922 (column 8, lines 29-66). Particular preference is given to using zinc hexacyanocobaltate(III).

The organic complex ligands added in the preparation of the DMC catalysts are disclosed, for example, in U.S. Pat. No. 5,158,922 (see especially column 6 lines 9 to 65), U.S. Pat. No. 3,404,109, U.S. Pat. No. 3,829,505, U.S. Pat. No. 3,941,849, EP-A 700 949, EP-A 761 708, JP 4 145 123, U.S. Pat. No. 5,470,813, EP-A 743 093 and WO-A 97/40086). The organic complex ligands used are, for example, water-soluble organic compounds containing heteroatoms such as oxygen, nitrogen, phosphorus or sulfur, which can form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec-butanol, tert-butanol, 2-methyl-3-buten-2-ol and 2-methyl-3-butyn-2-ol), compounds containing both aliphatic or cycloaliphatic ether groups and aliphatic hydroxyl groups (for example ethylene glycol mono-tert-butyl ether, diethylene glycol mono-tert-butyl ether, tripropylene glycol monomethyl ether and 3-methyl-3-oxetanemethanol). The organic complex ligands given greatest preference are selected from one or more compounds of the group consisting of dimethoxyethane, tert-butanol 2-methyl-3-buten-2-ol, 2-methyl-3-butyn-2-ol, ethylene glycol mono-tert-butyl ether and 3-methyl-3-oxetanemethanol.

Optionally, in the preparation of the inventive DMC catalysts, one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ethers, polyvinyl ethyl ethers, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethyl cellulose and polyacetals, or of the glycidyl ethers, glycosides, carboxylic esters of polyhydric alcohols, gallic acids or salts, esters or amides thereof, cyclodextrins, phosphorus compounds, α,β-unsaturated carboxylic esters or ionic surface- or interface-active compounds, are used.

Preferably, in the preparation of the inventive DMC catalysts, in the first step, the aqueous solutions of the metal salt (e.g. zinc chloride), used in a stoichiometric excess (at least 50 mol %) based on metal cyanide salt (i.e. at least a molar ratio of metal salt to metal cyanide salt of 2.25:1.00), and the metal cyanide salt (e.g. potassium hexacyanocobaltate) are converted in the presence of the organic complex ligand (e.g. tert-butanol), forming a suspension comprising the double metal cyanide compound (e.g. zinc hexacyanocobaltate), water, excess metal salt, and the organic complex ligands.

This organic complex ligand may be present in the aqueous solution of the metal salt and/or of the metal cyanide salt, or it is added directly to the suspension obtained after precipitation of the double metal cyanide compound. It has proven advantageous to mix the metal salt and metal cyanide salt aqueous solutions and the organic complex ligand by stirring vigorously. Optionally, the suspension formed in the first step is subsequently treated with a further complex-forming component. The complex-forming component is preferably used in a mixture with water and organic complex ligand. A preferred process for performing the first step (i.e. the preparation of the suspension) comprises using a mixing nozzle, particularly preferably using a jet disperser, as described in WO-A 01/39883.

In the second step, the solid (i.e. the precursor of the inventive catalyst) is isolated from the suspension by known techniques, such as centrifugation or filtration.

In a preferred execution variant, the isolated solid is subsequently washed in a third process step with an aqueous solution of the organic complex ligand (for example by resuspension and subsequent reisolation by filtration or centrifugation). In this way, it is possible to remove, for example, water-soluble by-products such as potassium chloride from the inventive catalyst. Preferably, the amount of the organic complex ligand in the aqueous wash solution is between 40% and 80% by weight, based on the overall solution.

Further complex-forming component is optionally added to the aqueous wash solution in the third step, preferably in the range between 0.5% and 5% by weight, based on the overall solution.

It is moreover advantageous to wash the isolated solid more than once. Preferably, in a first wash step (iii-1), an aqueous solution of the unsaturated alcohol is used for washing (for example by resuspension and subsequent reisolation by filtration or centrifugation), in order to remove, for example, water-soluble by-products such as potassium chloride from the inventive catalyst in this way. Especially preferably, the amount of the unsaturated alcohol in the aqueous wash solution is between 40 and 80% by weight, based on the overall solution in the first washing step. In the further wash steps (iii-2), either the first wash step is repeated once or more than once, preferably once to three times, or, preferably, a nonaqueous solution, for example a mixture or solution of unsaturated alcohol and further complex-forming components (preferably in the range between 0.5 and 5% by weight, based on the total amount of the wash solution in step (iii-2)), is used as a wash solution to wash the solid once or more than once, preferably once to three times.

The isolated and possibly washed solid is subsequently dried at temperatures of in general 20-100° C. and at pressures of in general 0.1 mbar to atmospheric pressure (1013 mbar), optionally after pulverizing.

A preferred process for isolating the inventive DMC catalysts from the suspension by filtration, filtercake washing and drying is described in WO-A 01/80994.

The present invention further provides a polyether ester carbonate polyol obtainable by the process of the invention.

The polyether ester carbonate polyols obtainable by the process of the invention have a low content of by-products and can be processed without difficulty, especially by reaction with di- and/or polyisocyanates to afford polyurethanes, in particular flexible polyurethane foams, for example flexible slabstock polyurethane foams and molded flexible polyurethane foams. For polyurethane applications, it is preferable to use polyether ester carbonate polyols based on an H-functional starter substance having a functionality of at least 2. In addition, the polyether ester carbonate polyols obtainable by the process according to the invention can be used in applications such as washing and cleaning composition formulations, drilling fluids, fuel additives, ionic and nonionic surfactants, lubricants, process chemicals for papermaking or textile manufacture, or cosmetic formulations. The person skilled in the art is aware that, depending on the respective field of use, the polyether ester carbonate polyols to be used have to fulfill certain material properties, for example molecular weight, viscosity, functionality and/or hydroxyl number.

The invention will now be more particularly discussed by means of examples.

EXAMPLES

Feedstocks:
H-Functional Starter Compounds
DPG: dipropylene glycol
Epoxides
PO: propylene oxide
Anhydrides
MA: maleic anhydride
Suspension Media
cPC: cyclic propylene carbonate
Catalyst The DMC catalyst used in all the examples was DMC catalyst prepared according to example 6 in WO 01/80994 A1.

Methods:

The polymerization reactions were conducted in a 300 ml Parr pressure reactor. The pressure reactor used in the examples had a height (internal) of 10.16 cm and an internal diameter of 6.35 cm. The reactor was equipped with an electrical heating jacket (510 watts' maximum heating power). The counter-cooling consisted of an immersed tube of external diameter 6 mm which had been bent into a U shape and which projected into the reactor up to 5 mm above the base, and through which cooling water flowed at about 10° C. The water flow was switched on and off by means of a magnetic valve. In addition, the reactor was equipped with an inlet tube and a thermal sensor of diameter 1.6 mm, which both projected into the reactor up to 3 mm above the base.

The sparging stirrer used in the examples was a hollow shaft stirrer in which the gas was introduced into the reaction mixture via a hollow shaft in the stirrer. The stirrer body mounted on the hollow shaft had four arms and had a diameter of 35 mm and a height of 14 mm. At each end of the arm were mounted two gas outlets which had a diameter of 3 mm. The rotation of the stirrer gave rise to a reduced pressure such that the gas present above the reaction mixture ($CO_2$ and possibly alkylene oxide) was drawn off and introduced through the hollow shaft of the stirrer into the reaction mixture. The abbreviation rpm refers to the number of revolutions of the stirrer per minute.

a) The terpolymerization of propylene oxide, anhydrides and $CO_2$ resulted not only in the cyclic propylene carbonate but also in the polyether ester carbonate polyol containing firstly polycarbonate units shown in formula (XVIa)

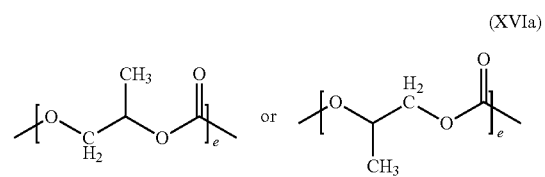

(XVIa)

and secondly polyether units shown in formula (XVIb)

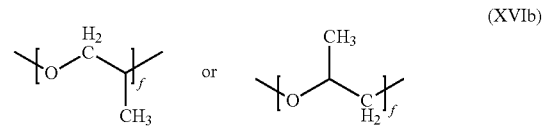

(XVIb)

The reaction mixture was characterized by $^1$H-NMR spectroscopy.

The ratio of the amount of cyclic propylene carbonate to polyether ester carbonate polyol (selectivity; ratio g/e) and also the fraction of unreacted monomers (propylene oxide $R_{PO}$, maleic anhydride $R_{MA}$ in mol %) were determined by means of $^1$H-NMR spectroscopy. For this purpose, a sample of each reaction mixture obtained after the reaction was dissolved in deuterated chloroform and measured on a Bruker spectrometer (AV400, 400 MHz).

Subsequently, the reaction mixture was diluted with dichloromethane (20 mL) and the solution was passed through a falling-film evaporator. The solution (0.1 kg in 3 h) ran downwards along the inner wall of a tube of diameter 70 mm and length 200 mm which had been heated externally to 120° C., in the course of which the reaction mixture was distributed homogeneously as a thin film on the inner wall of the falling-film evaporator in each case by three rollers of diameter 10 mm rotating at a speed of 250 rpm. Within the tube, a pump was used to set a pressure of 3 mbar. The reaction mixture which had been purified to free it of volatile constituents (unconverted epoxides, cyclic carbonate, solvent) was collected in a receiver at the lower end of the heated tube.

The molar ratio of carbonate groups to ether groups in the polyether ester carbonate polyol (ratio e/f) and also the molar fraction of anhydride incorporated into the polymer were determined by means of $^1$H-NMR spectroscopy. For this purpose, a sample of each purified reaction mixture was dissolved in deuterated chloroform and measured on a Bruker spectrometer (AV400, 400 MHz).

The relevant resonances in the $^1$H-NMR spectrum (based on TMS=0 ppm) which were used for integration are as follows:

I1: 1.10-1.17 ppm: methyl group of the polyether units, resonance area corresponds to three hydrogen atoms, I2: 1.25-1.34 ppm: methyl group of the polycarbonate units, resonance area corresponds to three hydrogen atoms, I3: 1.45-1.48 ppm: methyl group of the cyclic carbonate, resonance area corresponds to three hydrogen atoms I4: 2.95-3.00 ppm: CH group for free, unreacted propylene oxide, resonance area corresponds to one hydrogen atom, I5: 6.22-6.29 ppm: CH group of the double bond obtained in the polymer via the incorporation of maleic anhydride, resonance area corresponds to two hydrogen atoms, I6: 7.05 ppm: CH group for free, unreacted maleic anhydride, resonance area corresponds to two hydrogen atoms.

The figures reported are the molar ratio of the amount of cyclic propylene carbonate to carbonate units in the polyether ester carbonate polyol (selectivity g/e) and the molar ratio of carbonate groups to ether groups in the polyether ester carbonate polyol (e/f), and also the proportions of unconverted propylene oxide (in mol %) and maleic anhydride (in mol %).

Taking account of the relative intensities, the values were calculated as follows:

Molar ratio of the amount of cyclic propylene carbonate to carbonate units in the polyether ester carbonate polyol (selectivity g/e):

$$g/e = I3/I2 \quad (XIII)$$

Molar ratio of carbonate groups to ether groups in the polyether ester carbonate polyol (e/f):

$$e/f = I2/I1 \quad (XIV)$$

The proportion of carbonate units in the repeat units of the polyether ester carbonate polyol:

$$A_{carbonate} = [(I2/3)/((I1/3)+(I12/3)+(I5/2)))] \times 100\% \quad (XV)$$

The proportion of the double bonds which result via the incorporation of the maleic anhydride in the repeat units of the polyether ester carbonate polyol:

$$A_{double\ bond} = [(I5/2)/((I1/3)+(I2/3)+(I5/2)))] \times 100\% \quad (XVI)$$

The molar proportion of the unconverted propylene oxide ($R_{PO}$ in mol %) based on the sum total of the amount of propylene oxide used in the activation and the copolymerization, calculated by the formula:

$$R_{PO} = [I4/((I1/3)+(I2/3)+(I3/3)+I4))] \times 100\% \quad (XVII)$$

The molar proportion of the unconverted maleic anhydride ($R_{MA}$ in mol %) based on the sum total of the amount of maleic anhydride used in the activation and the copolymerization, calculated by the formula:

$$R_{MA} = [I6/(I5+I6)] \times 100\% \quad (XVIII)$$

The OH number (hydroxyl number) was determined in accordance with DIN 53240-2.

The number-average $M_n$ and the weight-average $M_w$ molecular weights of the resultant polyethercarbonate polyols were determined by means of gel permeation chromatography (GPC). The procedure was that of DIN 55672-1: "Gel permeation chromatography, Part 1—Tetrahydrofuran as eluent" (SECurity GPC system from PSS Polymer Service, flow rate 1.0 ml/min; columns: 2×PSS SDV linear M, 8×300 mm, 5 μm; RID detector). Polystyrene samples of known molar mass were used for calibration. The polydispersity was calculated as the ratio $M_w/M_n$.

Example 1: Preparation of a Polyether Ester Carbonate Polyol with Addition of Maleic Anhydride in Step β and γ

Step α:

A 300 ml pressure reactor equipped with a gas introduction stirrer was charged with a mixture of DMC catalyst (22.5 mg) and cyclic propylene carbonate (30 g) and this initial charge was stirred (800 rpm) at 110° C. for 30 minutes under a partial vacuum (50 mbar), with argon being passed through the reaction mixture.

Step β:

The suspension was then heated up to 130° C. and $CO_2$ was injected to 15 bar, in the course of which a slight drop in temperature was observed. On reattainment of a temperature of 130° C., 3.0 g of a monomer mixture (5% by weight of maleic anhydride dissolved in propylene oxide) were metered in with the aid of an HPLC pump (1 mL/min). The reaction mixture was stirred (800 rpm) at 130° C. for 20 min. The addition of 3.0 g of the monomer mixture was repeated a second and third time.

Step γ:

The temperature was kept at 110° C. by closed-loop control and, during the subsequent steps, the pressure in the pressure reactor was kept at 15 bar with the aid of a mass flow regulator by metering in further $CO_2$. While stirring, a further 60.2 g of a monomer mixture (5% by weight of maleic anhydride dissolved in propylene oxide) were metered in by means of an HPLC pump (1 mL/min), while continuing to stir the reaction mixture (800 rpm). Ten minutes after the start of the addition of the monomer mixture, 2.4 g of dipropylene glycol were metered in by means of a separate HPLC pump (0.05 mL/min) while stirring. After the addition of propylene oxide had ended, the reaction mixture was stirred at 110° C. for a further 30 min. The reaction was ended by cooling the pressure reactor in an ice bath, releasing the elevated pressure and analyzing the resulting product. The $CO_2$ content incorporated in the polyether ester carbonate polyol, the ratio of carbonate to ether units, the molecular weight obtained, the polydispersity index (PDI) and the OH number are reported in table 1.

Example 2: Preparation of a Polyether Ester Carbonate Polyol with Addition of Maleic Anhydride in step γ

Step α:

A 300 ml pressure reactor equipped with a gas introduction stirrer was charged with a mixture of DMC catalyst (22.5 mg) and cyclic propylene carbonate (30 g) and this initial charge was stirred (800 rpm) at 110° C. for 30 minutes under a partial vacuum (50 mbar), with argon being passed through the reaction mixture.

Step β:

The suspension was then heated up to 130° C. and $CO_2$ was injected to 15 bar, in the course of which a slight drop in temperature was observed, and re-attainment of a temperature of 130° C., 3.0 g of propylene oxide were metered in with the aid of an HPLC pump (1 ml/min). The reaction mixture was stirred (800 rpm) at 130° C. for 20 min. The addition of 3.0 g of propylene oxide was repeated a second and third time.

Step γ:

The temperature was kept at 110° C. by closed-loop control and, during the subsequent steps, the pressure in the pressure reactor was kept at 15 bar with the aid of a mass flow regulator by metering in further $CO_2$. While stirring, a further 60.2 g of a monomer mixture (5% by weight of maleic anhydride dissolved in propylene oxide) were metered in by means of an HPLC pump (1 mL/min), while continuing to stir the reaction mixture (800 rpm). Ten minutes after the start of the addition of the monomer mixture, 2.4 g of dipropylene glycol were metered in by means of a separate HPLC pump (0.05 mL/min) while stirring. After the addition of propylene oxide had ended, the reaction mixture was stirred at 110° C. for a further 30 min. The reaction was ended by cooling the pressure reactor in an ice bath, releasing the elevated pressure and analyzing the resulting product. The $CO_2$ content incorporated in the polyether ester carbonate polyol, the ratio of carbonate to ether units, the molecular weight obtained, the polydispersity index (PDI) and the OH number are reported in table 1.

Example 3 (Comp): Preparation of a Polyether Ester Carbonate Polyol with Addition of Maleic Anhydride in Step β

Step α:

A 300 ml pressure reactor equipped with a gas introduction stirrer was charged with a mixture of DMC catalyst (22.5 mg) and cyclic propylene carbonate (30 g) and this initial charge was stirred (800 rpm) at 110° C. for 30 minutes under a partial vacuum (50 mbar), with argon being passed through the reaction mixture.

Step β:

The suspension was then heated up to 130° C. and $CO_2$ was injected to 15 bar, in the course of which a slight drop in temperature was observed. On reattainment of a temperature of 130° C., 3.0 g of a monomer mixture (5% by weight of maleic anhydride dissolved in propylene oxide) were metered in with the aid of an HPLC pump (1 mL/min). The reaction mixture was stirred (800 rpm) at 130° C. for 20 min. The addition of 3.0 g of the monomer mixture was repeated a second and third time.

Step γ:

The temperature was kept at 110° C. by closed-loop control and, during the subsequent steps, the pressure in the pressure reactor was kept at 15 bar with the aid of a mass flow regulator by metering in further $CO_2$. While stirring, a further 60.2 g of propylene oxide were metered in by means of an HPLC pump (1 mL/min), while continuing to stir the reaction mixture (800 rpm). Ten minutes after the start of the addition of propylene oxide, 2.4 g of dipropylene glycol were metered in by means of a separate HPLC pump (0.05 mL/min) while stirring. After the addition of propylene oxide had ended, the reaction mixture was stirred at 110° C. for a further 30 min. The reaction was ended by cooling the pressure reactor in an ice bath, releasing the elevated pressure and analyzing the resulting product. The $CO_2$ content incorporated in the polyether ester carbonate polyol, the ratio of carbonate to ether units, the molecular weight obtained, the polydispersity index (PDI) and the OH number are reported in table 1.

Example 4 (Comparative): Preparation of a Polyether Ester Carbonate Polyol with Addition of Maleic Anhydride in Step α

Step α:

A 300 ml pressure reactor equipped with a gas introduction stirrer was charged with a mixture of DMC catalyst (22.5 mg), maleic anhydride (0.45 g) and cyclic propylene carbonate (30 g) and this initial charge was stirred (800 rpm) at 110° C. for 30 minutes under a partial vacuum (50 mbar), with argon being passed through the reaction mixture.

Step β:

The suspension was then heated up to 130° C. and $CO_2$ was injected to 15 bar, in the course of which a slight drop in temperature was observed. On reattainment of a temperature of 130° C., 3.0 g of propylene oxide were metered in with the aid of an HPLC pump (1 mL/min). The reaction mixture was stirred (800 rpm) at 130° C. for 20 min. The addition of 3.0 g of propylene oxide was repeated a second and third time.

Step γ:

The temperature was kept at 110° C. by closed-loop control and, during the subsequent steps, the pressure in the pressure reactor was kept at 15 bar with the aid of a mass flow regulator by metering in further $CO_2$. While stirring, a further 60.2 g of propylene oxide were metered in by means of an HPLC pump (1 mL/min), while continuing to stir the reaction mixture (800 rpm). Ten minutes after the start of the addition of propylene oxide, the reaction was stopped by cooling the reactor with ice-water, since no reaction was observed.

Example 5 (Comparative): Preparation of Polyether Carbonate Polyol without Addition of Maleic Anhydride A 300 ml pressure reactor equipped with a gas introduction stirrer was charged with a mixture of DMC catalyst (22.5 mg) and cyclic propylene carbonate (30 g) and this initial charge was stirred (800 rpm) at 110° C. for 30 minutes under a partial vacuum (50 mbar), with argon being passed through the reaction mixture.

Step β:

The suspension was then heated up to 130° C. and $CO_2$ was injected to 15 bar, in the course of which a slight drop in temperature was observed. On reattainment of a temperature of 130° C., 3.0 g of propylene oxide were metered in with the aid of an HPLC pump (1 mL/min). The reaction mixture was stirred (800 rpm) at 130° C. for 20 min. The addition of 3.0 g of propylene oxide was repeated a second and third time.

Step γ:

The temperature was kept at 110° C. by closed-loop control and, during the subsequent steps, the pressure in the pressure reactor was kept at 15 bar with the aid of a mass flow regulator by metering in further $CO_2$. While stirring, a further 60.2 g of propylene oxide were metered in by means of an HPLC pump (1 mL/min), while continuing to stir the reaction mixture (800 rpm). Ten minutes after the start of the addition of propylene oxide, 2.4 g of dipropylene glycol were metered in by means of a separate HPLC pump (0.05 mL/min) while stirring. After the addition of propylene oxide had ended, the reaction mixture was stirred at 110° C. for a further 30 min. The reaction was ended by cooling the pressure reactor in an ice bath, releasing the elevated pressure and analyzing the resulting product. The $CO_2$ content incorporated in the polyether ester carbonate polyol, the ratio of carbonate to ether units, the molecular weight obtained, the polydispersity index (PDI) and the OH number are reported in table 1.

TABLE 1

Overview of the results of the preparation of polyether ester carbonate polyol with variation of the time of addition of the cyclic anhydride

| Example | Time of addition | | | $CO_2$ incorporation [% by wt.] | e/f [—] | $M_n$ [g/mol] | PDI | OH number [$mg_{KOH} \cdot g^{-1}$] |
|---|---|---|---|---|---|---|---|---|
| | Step α | Step β | Step γ | | | | | |
| 1 | without MA | with MA | with MA | 12.4 | 0.25 | 5939 | 1.7 | 28.8 |
| 2 | without MA | without MA | with MA | 12.0 | 0.23 | 5429 | 2.0 | 28.8 |
| 3 (comp.) | without MA | with MA | without MA | 10.7 | 0.19 | 5905 | 1.9 | 29.9 |
| 4 (comp.) | with MA | without MA | without MA | No target product was obtained. | | | | |
| 5 (comp.) | without MA | without MA | without MA | 10.4 | 0.18 | 6943 | 2.4 | 26.2 | comp.: comparative example

Examples 1-2 and comparative examples 3-4 demonstrate that, in the case of addition of cyclic anhydrides in the polymerization stage (step γ) (example 1) and optionally likewise in the second activation stage (step β) (example 2), the proportion of the carbon dioxide incorporated into the polymer is increased, whereas, in comparison, in the case of addition of cyclic anhydride during the second activation stage only (step β) (comparative example 3) or the first activation stage (step α) (comparative example 4), a smaller proportion of carbon dioxide incorporated into the polymer is obtained. The proportion of carbon dioxide incorporated into the polymer is likewise increased by comparison with the corresponding copolymerization of alkylene oxide and carbon dioxide in the absence of a cyclic carbonate (comparative example 5).

Example 6: Preparation of a Polyether Ester Carbonate Polyol with Addition of Maleic Anhydride (10% by Weight of Maleic Anhydride Dissolved in Propylene Oxide) in step β and γ

Step α:
A 300 ml pressure reactor equipped with a gas introduction stirrer was charged with a mixture of DMC catalyst (22.5 mg) and cyclic propylene carbonate (30 g) and this initial charge was stirred (800 rpm) at 110° C. for 30 minutes under a partial vacuum (50 mbar), with argon being passed through the reaction mixture.

Step β:
The suspension was then heated up to 130° C. and $CO_2$ was injected to 15 bar, in the course of which a slight drop in temperature was observed. On reattainment of a temperature of 130° C., 3.0 g of a monomer mixture (10% by weight of maleic anhydride dissolved in propylene oxide) were metered in with the aid of an HPLC pump (1 mL/min). The reaction mixture was stirred (800 rpm) at 130° C. for 20 min. The addition of 3.0 g of the monomer mixture was repeated a second and third time.

Step γ:
The temperature was kept at 110° C. by closed-loop control and, during the subsequent steps, the pressure in the pressure reactor was kept at 15 bar with the aid of a mass flow regulator by metering in further $CO_2$. While stirring, a further 60.2 g of a monomer mixture (10% by weight of maleic anhydride dissolved in propylene oxide) were metered in by means of an HPLC pump (1 mL/min), while continuing to stir the reaction mixture (800 rpm). Ten minutes after the start of the addition of the monomer mixture, 2.4 g of dipropylene glycol were metered in by means of a separate HPLC pump (0.05 mL/min) while stirring. After the addition of propylene oxide had ended, the reaction mixture was stirred at 110° C. for a further 30 min. The reaction was ended by cooling the pressure reactor in an ice bath, releasing the elevated pressure and analyzing the resulting product. The $CO_2$ content incorporated in the polyether ester carbonate polyol, the ratio of carbonate to ether units, the molecular weight obtained, the polydispersity index (PDI) and the OH number are reported in table 2.

Example 7: Preparation of a Polyether Ester Carbonate Polyol with Addition of Maleic Anhydride (20% by Weight of Maleic Anhydride Dissolved in Propylene Oxide) in Step β and γ

Step α:
A 300 ml pressure reactor equipped with a gas introduction stirrer was charged with a mixture of DMC catalyst (22.5 mg) and cyclic propylene carbonate (30 g) and this initial charge was stirred (800 rpm) at 110° C. for 30 minutes under a partial vacuum (50 mbar), with argon being passed through the reaction mixture.

Step β:
The suspension was then heated up to 130° C. and $CO_2$ was injected to 15 bar, in the course of which a slight drop in temperature was observed. On reattainment of a temperature of 130° C., 3.0 g of a monomer mixture (10% by weight of maleic anhydride dissolved in propylene oxide) were metered in with the aid of an HPLC pump (1 mL/min). The reaction mixture was stirred (800 rpm) at 130° C. for 20 min. The addition of 3.0 g of the monomer mixture was repeated a second and third time.

Step γ:
The temperature was kept at 110° C. by closed-loop control and, during the subsequent steps, the pressure in the pressure reactor was kept at 15 bar with the aid of a mass flow regulator by metering in further $CO_2$. While stirring, a further 60.2 g of a monomer mixture (10% by weight of maleic anhydride dissolved in propylene oxide) were metered in by means of an HPLC pump (1 mL/min), while continuing to stir the reaction mixture (800 rpm). Ten minutes after the start of the addition of the monomer mixture, 2.4 g of dipropylene glycol were metered in by means of a separate HPLC pump (0.05 mL/min) while stirring. After the addition of propylene oxide had ended, the reaction mixture was stirred at 110° C. for a further 30 min. The reaction was ended by cooling the pressure reactor in an ice bath, releasing the elevated pressure and analyzing the resulting product. The $CO_2$ content incorporated in the polyether ester carbonate polyol, the ratio of carbonate to ether units, the molecular weight obtained, the polydispersity index (PDI) and the OH number are reported in table 2.

TABLE 2

Overview of the results of the preparation of polyether ester carbonate polyol with variation of the amount of the cyclic anhydride added

| Example | [MA]* [% by wt.] | $CO_2$ incorporation [% by wt.] | e/f [—] | $M_n$ [g/mol] | PDI | OH number [$mg_{KOH} \cdot g^{-1}$] |
|---|---|---|---|---|---|---|
| 1 | 5 | 12.5 | 0.25 | 5939 | 1.7 | 28.8 |
| 6 | 10 | 13.6 | 0.30 | 6810 | 2.1 | 27.8 |
| 7 | 20 | 17.4 | 0.56 | 6890 | 1.1 | 28.2 |
| 5 (comp.) | 0 | 10.7 | 0.19 | 6943 | 2.4 | 26.2 | comp.: comparative example;
*[MA] is the proportion of dissolved MA in PO

Examples 1, 6 and 7 demonstrate that a greater amount of anhydride leads to increased incorporation of carbon dioxide (higher e/f ratio) into the polyether ester carbonate polyol obtained. The proportion of carbon dioxide incorporated into the polymer is likewise increased by comparison with the corresponding copolymerization of alkylene oxide and carbon dioxide in the absence of a cyclic carbonate (comparative example 5).

The invention claimed is:
1. A process for preparing polyether ester carbonate polyols by adding at least one alkylene oxide, at least one cyclic anhydride, and carbon dioxide onto one or more H-functional starter substances in the presence of a double metal cyanide catalyst, wherein:
(α) a suspension medium containing no H-functional groups is initially charged in a reactor; and
(γ) one or more H-functional starter substances is metered continuously into the reactor during the reaction and the metered addition of one or more alkylene oxides, the cyclic anhydride, and optionally the carbon dioxide is effected simultaneously or sequentially.
2. The process as claimed in claim 1, wherein, in step (α), the suspension medium is initially charged together with the double metal cyanide catalyst.
3. The process as claimed in claim 2, wherein, after step (α),
(β) a portion of alkylene oxide is added to the mixture from step (α) at a temperature in the range of 90 to 150° C. and then the addition of the alkylene oxide compound and/or the cyclic anhydride is stopped, wherein step (β) is conducted under an inert gas atmosphere, or under an atmosphere of an inert gas-carbon dioxide mixture, or under a carbon dioxide atmosphere.
4. The process as claimed in claim 3, wherein, in step (β):
(β1) in a first activation stage, a first portion of alkylene oxide is added under inert gas atmosphere; and
(β2) in a second activation stage, a second portion of alkylene oxide is added under carbon dioxide atmosphere.

5. The process as claimed in claim 1, wherein, in step (γ), the H-functional starter substance, the alkylene oxide, and the cyclic anhydride are metered continuously into the reactor in the presence of carbon dioxide.
6. The process as claimed in claim 1, wherein, in step (γ), the metered addition of the H-functional starter substances is ended prior to the addition of the alkylene oxide and/or the cyclic anhydride.
7. The process as claimed in claim 1, wherein, in step (γ), the double metal cyanide catalyst is metered continuously into the reactor and the resulting reaction mixture is removed continuously from the reactor, and wherein the double metal cyanide catalyst is added continuously in suspension in the H-functional starter compound.
8. The process as claimed in claim 7, wherein, in a step (δ) downstream of step (γ), the reaction mixture that is removed continuously in step (γ) has an alkylene oxide content of 0.05% to 10% by weight and is transferred into a postreactor and subjected to a postreaction therein, wherein the postreaction reduces the content of free alkylene oxide to less than 0.05% by weight in the reaction mixture.
9. The process as claimed in claim 1, wherein the suspension medium comprises 4 methyl-2-oxo-1,3-dioxolane, 1,3-dioxolan-2-one, toluene, xylene, ethylbenzene, chlorobenzene, or dichlorobenzene, or a mixture of any thereof.
10. The process as claimed in claim 1, wherein the suspension medium comprises one or more aliphatic lactones, aromatic lactones, lactides, or cyclic carbonates having at least three optionally substituted methylene groups between the oxygen atoms of the carbonate group, or a mixture of any thereof.
11. The process as claimed in claim 1, wherein the cyclic anhydride comprises at least one compound of the formula (II), (III), or (IV):

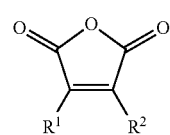

(II)

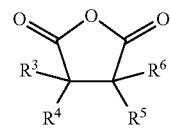

(III)

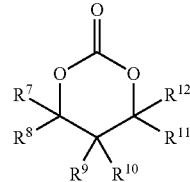

(IV)

wherein:
R1 and R2 are hydrogen, halogen, C1-C22-alkyl, C1-C22-alkenyl, or C6-C18-aryl, or R1 and R2 are members of a 4- to 7-membered ring or polycyclic system;
R3, R4, R5, and R6 are hydrogen, C1-C22-alkyl, C1-C22-alkenyl, or C6-C18-aryl, or are members of a 4- to 7-membered ring or polycyclic system; and
R7, R8, R9, R10, R11, and R12 are hydrogen, C1-C22-alkyl, C1-C22-alkenyl, or C6-C18-aryl, or are members of a 4- to 7-membered ring or polycyclic system.

12. The process as claimed in claim 1, wherein the H-functional starter substance comprises one or more alcohols, amines, thiols, amino alcohols, thio alcohols, hydroxy esters, polyether polyols, polyester polyols, polyester ether polyols, polycarbonate polyols, polyether carbonate polyols, polyethyleneimines, polyetheramines, polytetrahydrofurans, polyether thiols, polyacrylate polyols, castor oil, the mono- or diglyceride of castor oil, monoglycerides of fatty acids, chemically modified mono-, di-, and/or triglycerides of fatty acids or C1-C24-alkyl fatty acid esters containing an average of at least 2 OH groups per molecule, or a mixture of any thereof.

13. The process as claimed in claim 1, wherein the H-functional starter substance comprises ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, or di- and trifunctional polyether polyols, or mixtures of any thereof.

14. The process as claimed in claim 1, wherein:

(γ) the metered addition of the one or more H-functional starter substances, the at least one alkylene oxide, the at least one cyclic anhydride, and the carbon dioxide into the reactor is effected simultaneously and continuously during the reaction.

15. The process as claimed in claim 11, wherein the cyclic anhydride comprises succinic anhydride, maleic anhydride, or phthalic anhydride, or a mixture of any thereof.

16. The process as claimed in claim 13, wherein the polyether polyol is formed from a di- or tri-H-functional starter substance and propylene oxide, or from a di- or tri-H-functional starter substance, propylene oxide, and ethylene oxide, and the polyether polyol has a molecular weight $M_n$ in the range from 62 to 4500 g/mol and a functionality of 2 to 3.

* * * * *